United States Patent [19]

Otsuka et al.

[11] 4,097,841
[45] Jun. 27, 1978

[54] BRAKING FLUID PRESSURE FAULT ALARM DEVICE

[75] Inventors: Katsumi Otsuka, Toyota; Noriakira Ishigami, Chiryu; Asao Kozakai, Anjyo, all of Japan

[73] Assignee: Toyota Jidosha Kogyo Kabushiki Kaisha, Aichi, Japan

[21] Appl. No.: 732,213

[22] Filed: Oct 14, 1976

Related U.S. Application Data

[63] Continuation of Ser. No. 568,389, Apr. 16, 1975, abandoned.

[30] Foreign Application Priority Data

Apr. 17, 1974   Japan ................................. 49-44275

[51] Int. Cl.$^2$ ..................... B60T 8/26; B60T 11/34; B60T 17/18
[52] U.S. Cl. ......................... 340/52 C; 188/151 A; 200/82 D; 303/6 C
[58] Field of Search ................. 340/52 C, 60, 240; 200/82 D; 303/6 C; 188/151 A

[56] References Cited

U.S. PATENT DOCUMENTS

| 3,586,384 | 6/1971 | Falk | 303/6 C |
|---|---|---|---|
| 3,661,426 | 5/1972 | Tan | 303/6 C |
| 3,674,954 | 7/1972 | Kish et al. | 200/82 D |
| 3,700,286 | 10/1972 | Bueler | 303/6 C |
| 3,708,211 | 1/1973 | Bueler | 303/6 C |
| 3,717,382 | 2/1973 | Ayers, Jr. | 303/6 C |
| 3,772,672 | 11/1973 | Adahan | 340/242 |
| 3,836,204 | 9/1974 | Van Wicklin, Jr. | 303/6 C |

Primary Examiner—John W. Caldwell, Sr.
Assistant Examiner—Joseph E. Nowicki
Attorney, Agent, or Firm—Toren, McGeady and Stanger

[57] ABSTRACT

A fault alarm device for a vehicle dual brake system including front and rear master cylinders, front and rear wheel cylinders and a proportioning valve which functions to develop proportioned rear wheel braking fluid pressure at a reduced rate relative to the rear wheel braking fluid pressure from the rear master cylinder. The fault alarm device comprises a fault alarm circuit for indicating the fault in the dual brake system when energized, and a control valve interposed between the master cylinders and the wheel cylinders and associated with the proportioning valve. The control valve includes a body, a stepped cylinder formed in the body, a stepped piston slidably inserted in the stepped cylinder, and a sleeve slidably interposed between the stepped cylinder and piston. The alarm device further comprises a switch engaged with the stepped piston for energizing the alarm circuit in response to the sliding movement of the stepped piston from its neutral position. Thus, the stepped piston can be urged to slide from the neutral position under the force of the front wheel braking fluid pressure to insure indication of the fault in the dual brake system, even if the proportioned rear wheel braking fluid pressure between the proportioning valve and the rear wheel cylinders does not arise as a result of increase in the rear wheel braking fluid pressure from the rear master cylinder due to fault in the proportioning valve.

5 Claims, 1 Drawing Figure

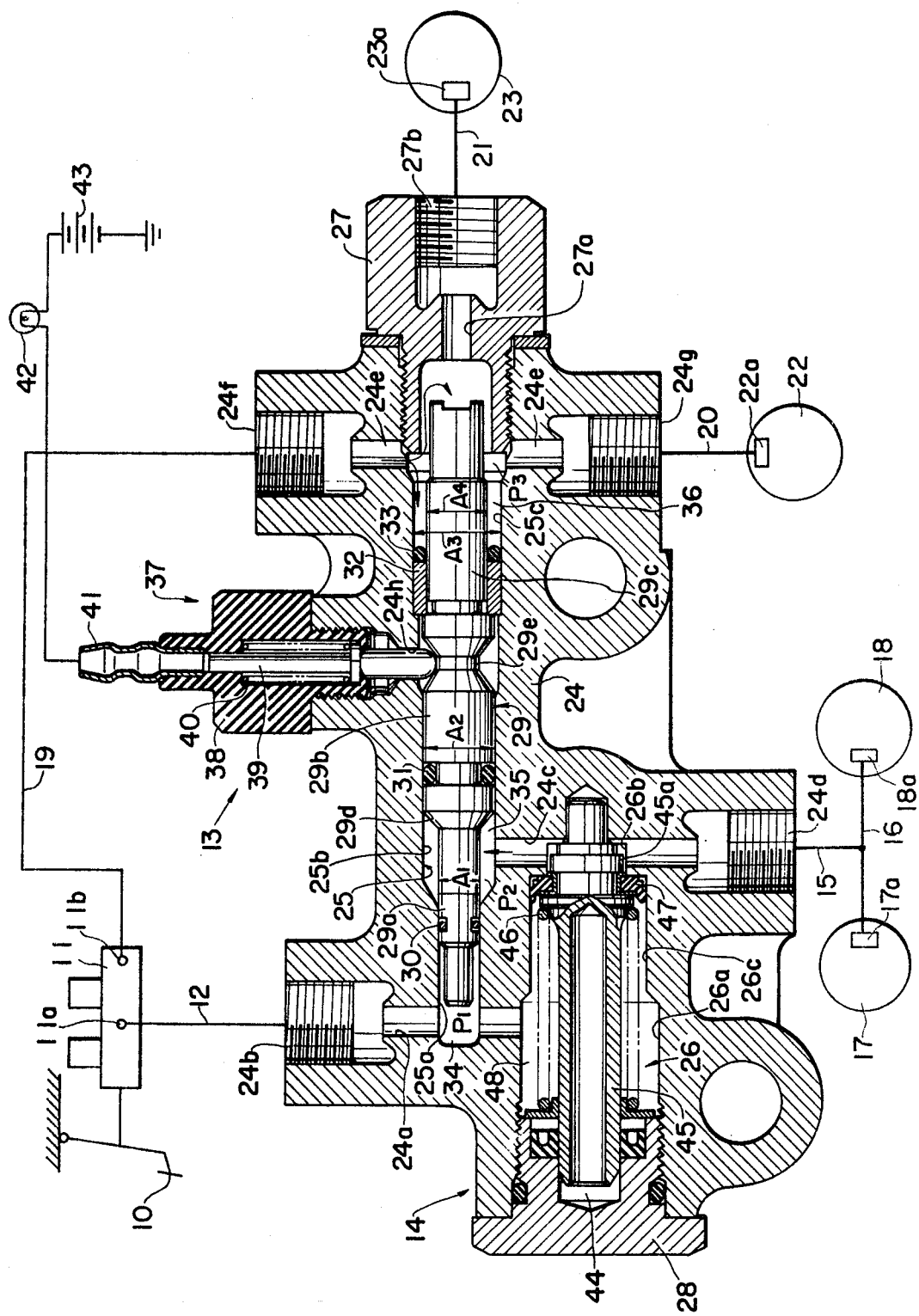

BRAKING FLUID PRESSURE FAULT ALARM DEVICE

This is a continuation of application Ser. No. 568,389 filed Apr. 16, 1975 now abandoned.

BACKGROUND OF THE INVENTION

This present invention relates to a braking fluid pressure fault alarm device for a vehicle dual brake system including a proportioning valve in its rear wheel brake system.

The present invention proposes a fault alarm device of the above type, which can afford an alarm signal even if the braking fluid pressure between the proportioning valve and the rear wheel cylinders does not arise as a result of increases in the rear wheel braking fluid pressure from the rear master cylinder due to fault in the proportioning valve.

SUMMARY OF THE INVENTION

The present invention can be described as a fault alarm device for a dual brake system of a vehicle such as an automobile, which includes brake actuating means, for example, a brake foot pedal. The dual brake system further includes front and rear master cylinders, front and rear wheel cylinders, and conduit means operatively providing fluid communications between the master cylinders and the wheel cylinders for applying braking fluid pressure from the former to the latter to brake the vehicle in response to operation of the actuating means. The dual brake system also includes a proportioning valve, which is interposed between the rear master cylinder and the rear wheel cylinders for developing proportioned rear wheel braking fluid pressure at a reduced rate relative to the rear wheel braking fluid pressure directly from the rear master cylinder. The fault alarm device according to a major aspect of the present invention comprises a fault alarm circuit including a fault alarm lamp which is lit to indicate the fault in the dual brake system when the alarm circuit is electrically energized. The fault alarm device of the present invention also comprises a control valve interposed between the master cylinders and said wheel cylinders and associated with the proportioning valve. The control valve includes a body defining therein a stepped cylinder which is formed with a smaller diameter portion at its one end, with a medium diameter portion at its intermediate portion and with a larger diameter portion at its other end, a stepped piston which has its smaller diameter end portion slidably but hermetically inserted in the smaller diameter end portion of the stepped cylinder, its larger diameter intermediate portion slidably but hermetically inserted in the medium diameter intermediate portion of the same and its medium diameter other end portion disposed in the larger diameter other end portion of the same, and a sleeve which is slidably but hermetically interposed between the medium diameter other end portion of the stepped piston and the larger diameter other end portion of the stepped cylinder. The fault alarm device of the present invention further comprises a switch which is engaged with the stepped piston for energizing the alarm circuit in response to the sliding movement of the stepped piston from its neutral position. In the fault alarm device, the rear wheel braking fluid pressure from the rear master cylinder is applied to the end face of the smaller diameter end portion of the stepped piston, and the proportioned rear wheel braking fluid pressure from the proportioning valve is applied to the boundary face between the smaller diameter end portion and the larger diameter intermediate portion of the stepped piston. In the fault alarm device, moreover, the front wheel braking fluid pressure from the front master cylinder is applied to the end faces and the same side of both the sleeve and the medium diameter other end portion of the stepped piston. Thus, the stepped piston can be urged to slide from the neutral position under the force of the front wheel braking fluid pressure to insure lighting of the fault alarm lamp, even if the proportioned rear wheel braking fluid pressure between the proportioning valve and the rear wheel cylinders does not arise as a result of increases in the rear wheel braking fluid pressure from the rear master cylinder due to fault in the proportioning valve.

Other objects and features of the present invention will now become apparent from the following description taken in conjunction with the accompanying drawing.

BRIEF DESCRIPTION OF THE DRAWING

The accompanying drawing is a partially sectional view showing a vehicle duel brake system incorporating one embodiment of the present invention.

DETAILED DESCRIPTION OF THE INVENTION

The present invention will now be described in conjunction with its one embodiment, which is shown in the accompanying drawing. Indicated at reference numeral 10 is a brake foot pedal which is made coactive with a tandem master cylinder 11 for a vehicle dual brake system. This tandem master cylinder 11 has its rear wheel braking fluid pressure outlet 11a communicated with by way of a conduit 12, a control valve 13 for the alarm device of the present invention, a proportioning valve 14 and conduits 15 and 16 with rear wheel cylinders 17a and 18a of right and left rear wheel brakes 17 and 18, respectively. The front wheel braking fluid pressure outlet 11b of the tandem master cylinder 11 is, on the other hand, communicated by way of a conduit 19, with the control valve 13 and conduits 20 and 21 with front wheel cylinders 22a and 23a of right and left front wheel brakes 22 and 23, respectively.

The control valve 13 as constructed according to the present invention will be described in detail in the following. This control valve 13 has a body 24 which also acts as a body for the proportioning valve 14. The body 24 is constructed to define a stepped cylinder 25 having its right end open and a stepped cylinder 26 having its left end open. The open end of the stepped cylinder 25 is closed up by a plug 27 which is fixedly screwed into the body 24, while the open end of the stepped cylinder 26 is also closed up by a plug 28 which is likewise screwed into the body 24. The stepped cylinder 25 is formed with a smaller diameter portion 25a at its left end, with a medium diameter portion 25b at its intermediate portion and with a large diameter portion 25c at its right end. The stepped piston 29 has its smaller diameter left end portion 29a slidably inserted in the smaller diameter left end portion 25a of the stepped cylinder 25 through a seal ring 30 which is fitted on the outer circumference of the smaller diameter portion 29a. The stepped piston 29 has its larger diameter intermediate portion 29b slidably inserted in the medium diameter intermediate portion 25b of the stepped cylinder 25 through a seal ring 31 which is fitted on the outer circumference of the larger diameter portion 29b. A sleeve 32 is slidably interposed between the larger diameter right end portion 25c of the stepped cylinder 25 and a medium diameter right end portion 29c of the stepped piston 29, and a seal ring 33 is mounted to maintain a hermetically sealed condition between the sleeve 32 and the larger diameter and medium diameter portions 25c and 29c. A fluid chamber 34, into which the end face of the smaller diameter left end portion 29a of the stepped piston 29 is constructed to extend, has fluid communication through a bore 24a, which is formed in the body 24, with an inlet port 24b, which is also formed in the body 24, and with a larger diameter portion 26a of the stepped cylinder 26. On the other hand, a fluid chamber 35, to which a boundary face between the smaller diameter portion 29a and the larger diameter portion 29b of the stepped piston 29 is exposed, is constructed to have fluid communication through a bore 24c, which is formed in the body 24, with an outlet port 24d, which is also formed in the body 24, and with a smaller diameter portion 26b of the stepped cylinder 26. Furthermore, a fluid chamber 36, into which the end face of the medium diameter right end portion 29c of the stepped piston 29 extends, is constructed not only to have fluid communication through bores 24e, which are formed in the body 24, with inlet and outlet ports 24f and 24g, which are also formed in the body 24, but also to have fluid communication through a bore 27a, which is formed in the plug 27, with an outlet port 27b which is also formed in the plug 27.

A switch 37 includes a body 38 made of an electrically insulating material and has its smaller diameter lower end portion screwed into the common body 24. In this body 38 is vertically slidably inserted a plunger 39 which is biased downward by a spring 40. The plunger 39 has its lower end portion extending through a bore 24h, which is formed in the body 24, into the medium diameter intermediate portion 25b of the stepped cylinder 25. At its extremity, the lower end portion of the plunger 39 is fitted in and engaged with an annular groove 29e of a trapezoidal cross section which is formed on the outer circumference of the larger diameter intermediate portion 29b of the stepped piston 29. To the upper end portion of the body 38 is secured a tubular terminal 41, into which the upper end of the plunger 39 can be inserted, when the plunger 39 is moved upward from the position as shown in the drawing, so as to provide electric contact between the plunger 39 and the terminal 41. This terminal 41 is electrially connected with a fault alarm lamp 42 through a grounded electric power source 43.

Here, the proportioning valve 14 may be of a conventional construction and is formed with an air chamber 44, into which the left end of a piston 45 is constructed to extend. This piston 45 is biased in the right hand direction by a spring 46 so as to determine the initiation timing for control of the rear wheel braking fluid pressure. The piston 45 is formed on the outer circumference of its right end portion with a land 45a which is detachably engaged with a cup-shaped valve 47 as is arranged at the right end of a medium diameter portion 26c of the stepped cylinder 26. This valve 47 is formed with a multiplicity of projections at both its ends. Indicated at reference numeral 48 is a fluid chamber, in which the spring 46 is accommodated.

Thus, in normal braking operation, when the brake foot pedal 10 is depressed, equal braking fluid pressure is established by the tandem master cylinder 11 at its outlets 11a and 11b. The rear wheel braking fluid pressure from the outlet 11a is introduced through the conduit 12, the inlet port 24b and the bore 24a into the fluid chamber 34 and further through the bore 24a, the fluid chamber 48, the clearance between the piston 45 and the valve 47, and the bore 24c into the fluid chamber 35. The braking fluid pressure thus introduced into the fluid chamber 35 is further introduced through the outlet port 24d and the conduits 15 and 16 into the rear wheel cylinders 17a and 18a. On the other hand, the front wheel braking fluid pressure established at the outlet 11b is introduced through the conduit 19, the inlet port 24f and the bore 24e into the fluid chamber 36 and further through the bore 24e, the outlet port 24g and the conduit 20 into the front wheel cylinder 22a. The braking fluid pressure branched from the fluid chamber 36 is at the same time introduced through the bore 27a, the outlet port 27b and the conduit 21 into the other front wheel cylinder 23a. At this instant, the braking fluid pressure $P_1$ in the fluid chamber 34 is exerted upon the cross-sectional area $A_1$ of the smaller diameter portion 29a of the stepped piston 29 so as to urge the stepped piston 29 rightwardly. And, the braking fluid pressure $P_2$ in the fluid chamber 35 is exerted upon the differential area $(A_2-A_1)$ between the crosssectional area $A_2$ of the larger diameter portion 29b and the cross-sectional area $A_1$ of the smaller diameter portion 29a of the stepped piston 29 so as to urge the stepped piston 29 rightwardly. The fluid pressure $P_3$ in the fluid chamber 36 is, on the contrary, exerted not only upon the crosssectional area $A_4$ of the medium diameteter portion 29c of the stepped piston 29 to urge the stepped piston 29 leftwardly but also upon the cross-sectional area $(A_3-A_4)$ of the sleeve 32 to urge the sleeve 32 leftwardly. Under this condition, in the case where the braking fluid pressure supplied from the tandem master cylinder 11 has not yet reached yet the control commencing level of the braking fluid pressure of the proportioning valve 14, the fluid pressure $P_2$ is at the same level as that of the fluid pressure $P_1$ and $P_3$. Thus, since the urging force, which is imparted to the stepped piston 29 by the fluid pressure exerted directly upon the stepped piston 29, is in the rightward direction, and since the sleeve 32 is urged by the fluid pressure in the leftward direction, the right end face of the larger diameter portion 29b of the stepped piston 29 is brought into abutment engagement with the left end face of the sleeve 32. As a result, the leftward urging force to be imparted to the sleeve 32 by the fluid pressure is additionally exerted upon the stepped piston 29, so that the stepped piston 29 will be made to slide in the leftward direction together with the sleeve 32, as shown in the drawing, until the left end face of the sleeve 32 has abutted against the larger diameter portion 25c of the stepped cylinder 25.

After the braking fluid pressure supplied from the tandem master cylinder 11 has reached the control commencing level of the braking fluid pressure of the proportioning valve 14, the piston 45 of the proportioning valve 14 is made to slide in the leftward direction to bring its land 45a into abutment engagement with the valve 47 to thereby block fluid communication between the fluid chamber 48 and the bore 24c. After that, as the braking fluid pressure from the tandem master cylinder 11 increases, the fluid communication between the fluid chamber 48 and the bore 24c is subjected to hunting operation, that is, oscillatory intermittent operation to reduce the braking fluid pressure, which is to be supplied into the rear wheel cylinders 17a and 18a, at a constant rate relative to the braking fluid pressure supplied from the tandem master cylinder 11.

Under the condition, in which the braking fluid pressure from the tandem master cylinder 11 exceeds the control commencing level of the braking fluid pressure of the proportioning valve 14, the fluid pressure $P_2$ in the fluid chamber 35 is reduced at a predetermined ratio relative to the fluid pressures $P_1$ and $P_3$, but the difference inbetween can be calculated with ease from the characteristics of the proportioning valve 14 and from the maximum level of the braking fluid pressure established in the tandem master cylinder 11. Thus, the stepped piston 29 can be prevented from sliding leftwardly by appropriately selecting the ratios among the cross-sectional areas $A_1$, $A_2$, $A_3$ and $A_4$.

When, in this instance, the front wheel braking fluid pressure $P_3$ is reduced to an abnormally low level due to fault or failure in the front wheel brake system, the urging force, which is established due to the rear wheel braking fluid pressures $P_1$ and $P_2$ urging the stepped piston 29 in the rightward direction, can overcome the urging force, which is established due to the front wheel braking fluid pressure $P_3$ urging the stepped piston 29 and the sleeve 32 in the leftward direction, so that the stepped piston 29 and the sleeve 32 will be made to slide integrally in the rightward direction from the position as shown in the drawing. As a result, the plunger 39 of the switch 37 is raised up by the left slope of the annular groove 29e of the stepped piston 29 to have its upper end brought into the terminal 41, thus grounding the terminal 41 to the earth through the plunger 39, the stepped piston 29, the body 24 and the not-shown vehicle body with the resultant energization of the fault alarm lamp 42. Thus, this alarm lamp 42 is lit to indicate the abnormal condition in the front wheel braking fluid pressure until the fluid pressure is restored its normal level. In this particular case, the seal ring 30 on the outer circumference of the smaller diameter portion 29a of the stepped piston 29 is moved from the smaller diameter portion 25a to the medium diameter portion 25b of the stepped cylinder 25. It should be noted here that fluid communication can still be provided between the fluid chambers 34 and 35 since the smaller diameter portion 29a of the stepped piston 29 has its leading end portion further restricted. As a result, the rear wheel braking fluid pressure from the tandem master cylinder 11 can be introduced directly into the rear wheel cylinders 17a and 18a, thus eliminating most efficiently the excessive reduction in the rear wheel braking force, which might otherwise invite a serious accident.

If, on the other hand, the rear wheel braking fluid pressure $P_1$ and $P_2$ are reduced to abnormally low levels due to fault or failure in the rear wheel brake system, the urging force, which is established due to the front wheel braking fluid pressure $P_3$ urging the stepped piston in the leftward direction, can overcome the urging force, which is established due to the rear wheel braking fluid pressures $P_1$ and $P_2$ urging the stepped piston 29 in the rightward direction, so that the stepped piston 29 will be made to slide in the leftward direction. As a result, the plunger 39 of the switch 37 is raised up by the right slope of the annular groove 29e to have its upper end brought into the terminal 41 to likewise light the alarm lamp 42. This alarm signal continues until the fluid pressures $P_1$ and $P_2$ are restored to their normal levels.

In the case, on the other hand, where the fluid communication between the fluid chamber 48 and the bore 24c remains blocked up as a result of deterioration in movement of the piston due to some cause, for instance, formation of rust in the proportioning valve 14, the level of the rear wheel braking fluid pressure cannot be increased even with increase in the braking fluid pressure supplied from the tandem master cylinder 11. In this case, during the boosting operation of the braking fluid pressure from the tandem master cylinder 11, the urging force, which is established due to the front wheel braking fluid pressure $P_3$ urging the stepped piston in the leftward direction, can overcome the urging force, which is established due to the rear wheel braking fluid pressures $P_1$ and $P_2$ urging the stepped piston 29 in the rightward direction, so that the stepped piston 29 will be made to slide in the leftward direction to render the switch 37 conductive, thus lightening the alarm lamp 42. This alarm signal also continues until the fluid pressure to be introduced into the rear wheel cylinders 17a and 18a is restored their normal levels.

As has been described in the beforehand, it should be appreciated that the fault alarm device according to the present invention can produce an alarm signal when the rear wheel braking fluid pressure between the proportioning valve and the rear wheel cylinders cannot follow the increase in the rear wheel braking fluid pressure between the proportioning valve and the master cylinder due to fault or failure in the proportioning valve, in addition to the cases where the front wheel braking fluid pressure $P_3$ is reduced to an abnormally low level and where the rear wheel braking fluid pressures $P_1$ and $P_2$ are reduced to abnormally low levels. Moreover, since such fault in the proportioning valve is actually experienced by the driver of the vehicle and since the fault alarm device can be put into practice by slightly modifying the vehicle dual brake system of the conventional construction such that the modification requires no additional part nor element, it should also be appreciated that the present invention can find prominent utility in the relevant art.

What is claimed is:

1. A braking fluid pressure fault alarm device for a vehicle dual brake system having brake actuating means, a front brake system including a front master cylinder and front wheel cylinders, a rear brake system including a rear master cylinder and rear wheel cylinders, conduit means operatively providing fluid communication between said master cylinders and said wheel cylinders for applying braking fluid pressure from said master cylinders to said wheel cylinders to brake said vehicle in response to operation of said actuating means, and proportioning valve means interposed between the rear master cylinder and the rear wheel cylinders of said rear brake system for developing proportioned rear wheel braking fluid pressure which is regulated in proportion to the rear wheel braking fluid pressure from said rear master cylinder, said fault alarm device comprising: signal means for generating a fault-indicating alarm signal when an alarm circuit is energized for closure; control valve means interposed between said master cylinders and said wheel cylinders and associated with said proportioning valve means, said control valve means including a body having therein a stepped cylinder which comprises a smaller diameter portion at its one end, a medium diameter portion at its intermediate portion, and a larger diameter portion at its other end; a stepped piston having a smaller diameter end portion defining an end face slidably but hermetically inserted in the smaller end portion of said stepped cylinder, a larger diameter intermediate portion defining together with said smaller diameter end portion a boundary face therebetween and slidably but hermetically inserted in the medium diameter intermediate portion of said stepped cylinder and a medium diameter other end portion defining an end face and disposed in the larger diameter other end portion of said stepped cylinder; a sleeve defining an end face and slidably but hermetically interposed between the medium diameter other end portion of said stepped piston and the larger diameter other end portion of said stepped cylinder; said stepped piston being axially movable to a neutral position and in axially opposed directions therefrom; switch means engaged with said stepped piston of said control valve means for energizing said alarm circuit in response to the sliding movement of the stepped piston of said control valve means from its neutral position; and connecting means for applying the rear wheel braking fluid pressure from said rear master cylinder to the end face of the smaller diameter end portion of said stepped piston, the proportioned rear wheel braking fluid pressure from said proportioning valve means to the boundary face between the smaller diameter end portion and the larger diameter intermediate portion of said stepped piston, and the front wheel braking fluid pressure from said front master cylinder to the end faces of both of said sleeve and the medium diameter other end portion of said stepped piston; said end face of said medium diameter other end portion of said stepped piston having a greater surface area than said end face of said smaller diameter end portion of said stepped piston; with deterioration of the proportioned rear wheel braking fluid pressure between said proportioning valve means and said rear wheel cylinders occurring as a result of fault in said proportioning valve means despite increases in the rear wheel braking fluid pressure from said master cylinder operating to urge said stepped piston to slide from said neutral position under the force of the front wheel braking fluid pressure to insure a fault indication in said signal means.

2. A braking fluid pressure fault alarm device according to claim 1, wherein said stepped piston comprises an annular groove, and wherein said switch means is mounted on the body of said control valve means and includes a body defining therein a cylindrical chamber, a plunger slidably but hermetically, inserted in said cylindrical chamber, a spring disposed in said cylindrical chamber around said plunger for biasing said plunger in a manner to bring said plunger into engagement with said annular groove, and a terminal secured hermetically to said cylindrical chamber and spaced from said plunger, said terminal being electrically connected with said signal means and adapted to make contact with said plunger when said plunger is moved against the biasing action of said spring in response to the sliding movement of said stepped piston from said neutral position.

3. A braking fluid pressure fault alarm device according to claim 1, wherein said switch means is composed of a metal tubular member secured in an insulator member and a metal plunger arranged substantially perpendicular to and engaged with said stepped piston, said device including means for connecting said plunger and said tubular member to ground when they are in contact with each other.

4. A braking fluid pressure fault alarm device according to claim 1, wherein, upon excess of said rear wheel braking fluid pressure over said front wheel braking fluid pressure due to fault or failure in said front wheel brake system, the movement of said piston establishes direct connection between said master cylinder and said rear wheel cylinders thereby increasing additionally said rear wheel braking fluid pressure.

5. A braking fluid pressure fault alarm device according to claim 1, wherein said signal means includes a signalling lamp connected therein.

* * * * *